United States Patent
Bijanki et al.

(10) Patent No.: US 6,539,223 B1
(45) Date of Patent: Mar. 25, 2003

(54) MOBILE TELECOMMUNICATIONS DEVICE HAVING MULTIPLE DIRECTORY NUMBER CAPABILITY

(75) Inventors: Ramakrishna Bijanki, Pebble Bay (SG); Perminder Dhawan, Naperville, IL (US); Bijan Farhang, Naperville, IL (US); Patrick Li, Regency Park (SG); John MacNamara, Orland Park, IL (US); Sandip Mukerjee, Warren, NJ (US); Pradeep Sharma, Aurora, IL (US); Kenneth Shelhamer, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/413,691

(22) Filed: Oct. 7, 1999

(51) Int. Cl.⁷ .................................. H04Q 7/20
(52) U.S. Cl. ................. 455/432; 455/414; 455/433; 455/435; 455/456; 455/552
(58) Field of Search ................ 455/432, 433, 455/435, 456, 552, 414

(56) References Cited

U.S. PATENT DOCUMENTS

| | | | | |
|---|---|---|---|---|
| 5,815,814 A | * | 9/1998 | Dennison | 455/456 |
| 5,878,348 A | * | 3/1999 | Foti | 455/434 |
| 5,884,200 A | * | 3/1999 | Yamame | 455/575 |
| 5,905,955 A | * | 5/1999 | Bamburak | 455/434 |
| 5,933,785 A | * | 8/1999 | Tayloe | 455/558 |
| 5,943,620 A | * | 8/1999 | Boltz | 455/445 |
| 5,949,770 A | | 9/1999 | Liu et al. | |
| 5,983,095 A | * | 11/1999 | Cameron | 455/414 |
| 6,044,261 A | * | 3/2000 | Kazmi | 455/408 |
| 6,097,950 A | * | 8/2000 | Bertacchi | 455/432 |
| 6,148,197 A | * | 11/2000 | Bridges | 455/432 |
| 6,201,957 B1 | * | 3/2001 | Son | 455/406 |
| 6,259,914 B1 | * | 7/2001 | Koster | 455/432 |
| 2001/0012779 A1 | * | 8/2001 | Skog | 455/436 |

FOREIGN PATENT DOCUMENTS

| | | |
|---|---|---|
| DE | 19639413 | 2/1998 |
| EP | 0783235 | 9/1997 |

OTHER PUBLICATIONS

Mouly M. Pautet M0B, *The GSM System for Mobile Communications*, Cell & Sys. Mercer Island, WA, US XP000860008, pp. 500–565, 1992.
European Search Report (Mar. 16, 2001) (2 pages).

* cited by examiner

*Primary Examiner*—William Trost
*Assistant Examiner*—Marcos Torres

(57) ABSTRACT

A mobile telecommunications system includes within a serving system database entries that associate the identifier of a mobile unit, which could be a cellular telephone or a personal communications service (PCS) device, with a plurality of directory numbers. The mobile unit identifier may be a mobile identification number (MIN) or international mobile service identifier (IMSI), for example. The system may store this association within a home location register (HLR), within a mobile switching center (MSC), or in both. In the process of terminating a telephone call the system employs supplemental information to determine which of the plurality of directory numbers associated with the mobile unit's mobile identifier is to be employed for the purposes of the telephone call being terminated. The supplemental information may be the current location of the mobile unit, for example.

8 Claims, 4 Drawing Sheets

MOBILE TELECOMMUNICATIONS DEVICE HAVING MULTIPLE DIRECTORY NUMBER CAPABILITY

FIELD OF THE INVENTION

The invention relates to wireless telecommunications, and, more particularly, to the association between a mobile station and directory numbers.

BACKGROUND OF THE INVENTION

The use of mobile telecommunications systems, including cellular telephones and personal communications services (PCS), has seen explosive growth, particularly in the past decade. The use of mobile, or cellular, telephones has become so commonplace that it is not unusual to see people conversing on the telephone as they walk along the sidewalk, as they drive, even as they attend a concert or a play.

Conventional mobile telecommunications services employ a mobile identification number (MIN) for authentication, for termination, and for many other operations. However, the mobile identification number has proven inadequate for worldwide applications. Consequently, systems are being developed which employ an international mobile subscriber identity (IMSI) that will allow mobile telecommunications devices to operate seamlessly throughout the world. At some point, when IMSI devices are introduced there will be a mix of devices operating in the field; some mobile devices will employ a mobile identification number, some will employ an international mobile subscriber identity that is based on a more conventional mobile identification number, and some will employ "pure" IMSI numbers.

During the process of establishing, or "terminating a telephone call (which may involve the transmission of voice, data, or both) that involves a mobile station, a wireless system associates a directory number with the identifier (MIN or IMSI). A conventional wireless system may store the mobile unit's identification/directory number association information in the mobile unit's home location register (HLR). Only one directory number is associated with a given mobile identifier. This restriction limits the flexibility with which a mobile unit may be used and limits the range of services a mobile telecommunications service provider may offer to an end-user.

SUMMARY

A mobile telecommunications system in accordance with the principles of the present invention includes database entries that associate the identifier of a mobile unit, which could be a cellular telephone or a personal communications service (PCS) device, with a plurality of directory numbers. The mobile unit identifier may be a mobile identification number (MIN) or international mobile service identifier (IMSI), for example. The system may store this association within a home location register (HLR), within a mobile switching center (MSC), or in both. In the process of terminating a telephone call the system employs supplemental information to determine which of the plurality of directory numbers associated with the mobile unit's mobile identifier is to be employed for the purposes of the telephone call being terminated. The supplemental information may be the current location of the mobile unit, for example. In such an embodiment, one directory number may be employed to terminate a telephone call within one geographic area, another directory number may be employed to terminate a telephone call within a different geographic area, and so on. Different services and prices may then be associated with each directory number, and, indirectly, with supplemental information, such as the current location of the mobile station.

The location of the mobile unit may be determined, for example, from cell and sector information located at a mobile switching, for example. Alternatively, the geographical information may be supplied to the mobile telecommunications system from a global positioning system (GPS) receiver associated with the mobile unit. Each directory number may be associated with a different level of services, with corresponding pricing differences, for example.

BRIEF DESCRIPTION OF THE DRAWINGS

The above and further features, aspects, and advantages of the invention will be apparent to those skilled in the art from the following detailed description, taken together with the accompanying drawings in which.

DETAILED DESCRIPTION

Figure 1:
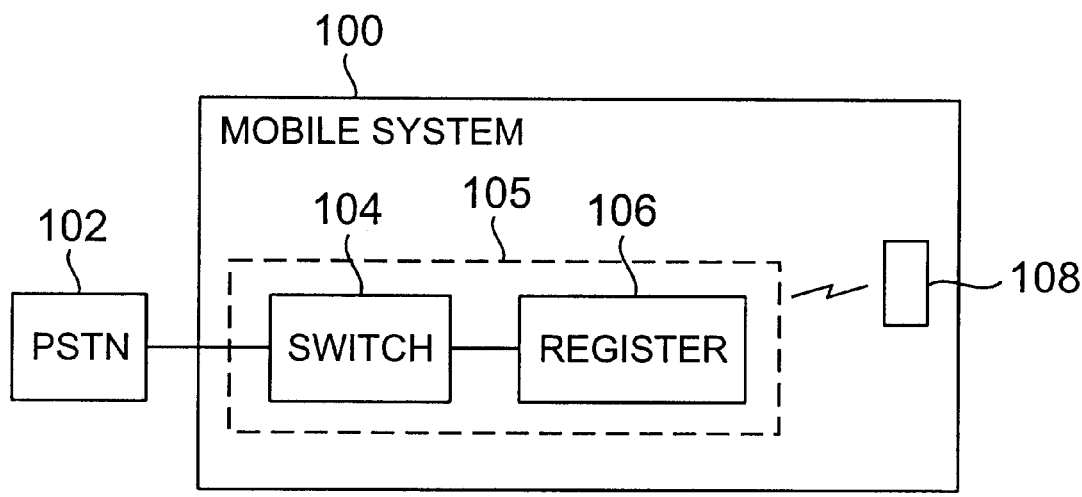
FIG. 1 is a conceptual block diagram of a mobile communications system in accordance with the principles of the present invention, in combination with a publicly switched telephone network.

The conceptual block diagram of FIG. 1 illustrates a mobile telecommunications system 100 in accordance with the principles of the present invention. The mobile system 100 may be operated in conjunction with the publicly switched telephone network, or land system, 102. The mobile telecommunications system 100 includes a serving system 105 and a home location register 106, which communicate with one another. The serving system may include one or more visiting location registers and one or more base stations, for example. In particular, the mobile telecommunications system 100 includes at least one switching component 104, such as a mobile switching center, at least one registering component 106, such as a home location register, and at least one mobile station 108. The mobile station may be of the mobile identification number (MIN) type, international mobile subscriber identity (IMSI) type, MIN-based IMSI type, or both MIN-based IMSI and IMSI type.

In accordance with the principles of the present invention, the mobile telecommunications system 100 establishes a connection from a land station, as follows. When a call is directed to a mobile station 108 from the publicly switched telephone network 102, the land system routes the call to the appropriate switching component 104 (only one of which is shown in this Figure) within the mobile system. The switching component 104 forwards the dialed digits, along with other information, to the registering component 106 to which the mobile station is assigned, and requests routing information for the mobile station 108 associated with the dialed digits. In response to the request for routing information, the registering component 106 returns routing information to the switching component 104. In accordance with the principles of the present invention, the serving system 105 includes a database that may be located within the registering component 106 for example. The database includes the association between the mobile's identifier (MIN or IMSI) and the mobile's directory numbers. This information may be relayed to the switching component 104, for example. As will be described in greater detail in the discussion related to FIGS. 5 through 8, the serving system 105 correlates the identifier information with supplemental information, such as the present geographical location of the mobile station 108, to determine which of the directory numbers to associate with the mobile station 108 for this particular telephone call. Calls originating at the mobile station 108 are handled in a similar manner, as described in greater detail in the discussion related to FIGS. 3 and 4, with the serving system 105 correlating the mobile identifier with supplemental information to determine which of the mobile station's directory numbers to employ for the current telephone call.

Figure 2:
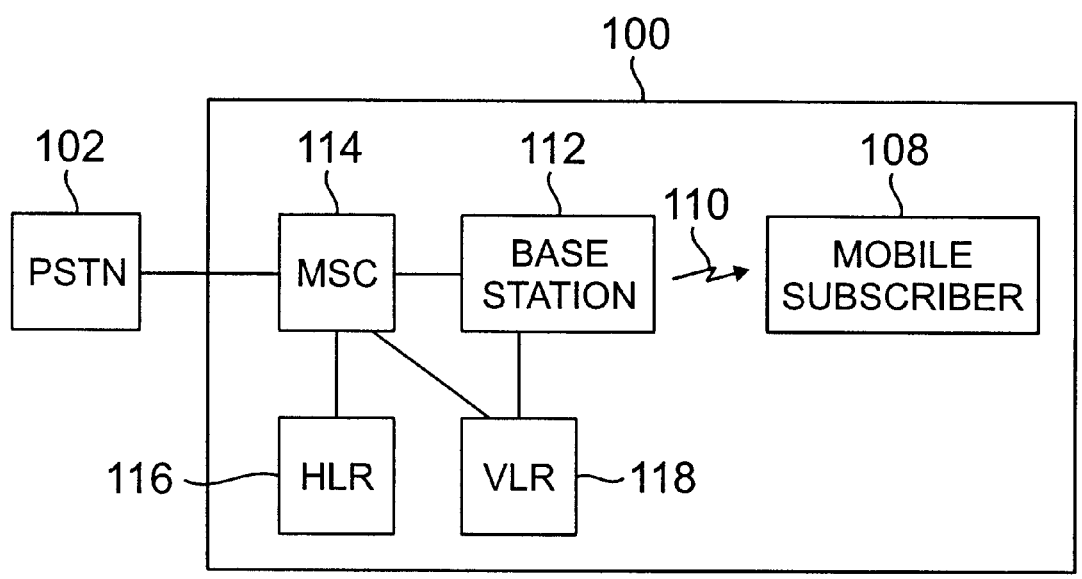
FIG. 2 is a more detailed conceptual block diagram of a mobile telecommunications system in accordance with the principles of the present invention.

The conceptual block diagram of FIG. 2 provides a more detailed view of a mobile telecommunications system in accordance with the principles of the present invention. The illustrative system 100 includes a mobile station 108, which may communicate, via a wireless link 110 with a base station 112. The base station, in turn, communicates with a mobile switching center 114 which operates as the switching component 104 in this illustrative embodiment. The mobile switching center 114 provides interfaces to the landline system 102 and to the remainder of the wireless, or mobile telecommunications system 100. The switching center 114 also provides mobility management for mobile stations.

The mobile system 100 also includes a complement of components that operate in accordance with TIA/EIA 41D, a telecommunications standard that is hereby incorporated by reference in its entirety. These components include a home location register (HLR) 116, which operates as the registering component 106 in this illustrative embodiment. The home location register 116 includes a database which stores, among other things, a permanent copy of the mobile subscriber's subscription information and location information which permits calls to be routed toward the mobile switching center associated with the mobile unit's current location. This information may include such things, as the mobile station roaming number (MSRN) or temporary local directory number (TLDN), a visiting location register (VLR) 118 address, the mobile switching center (MSC) 114 address, the mobile subscriber ISDN number (MSISDN) teleservices and bearer services subscription information, and service restrictions, such as roaming limitations, and supplementary service parameters. A stand-alone home location register supports such features as call delivery, message waiting notification, call forwarding, remote feature control, call transfer, subscriber PIN intercept, call waiting, conference calling, and voice message retrieval. Two "keys" are typically required to access the home location register 116. They are: an international mobile subscriber identity (IMSI) (or mobile identity number MIN) and a mobile station ISDN number or (MSISDN).

In this illustrative embodiment, the HLR 116 also includes two or more directory numbers for at least one of the mobile stations it serves. One of the directory numbers may be associated with the mobile station 108 if the station is within a specified sector of a particular mobile system "cell" and another of the directory numbers may be associated with the mobile station if the station is anywhere other than in that cell sector. The location information may be obtained from the mobile switching system 114, for example. This association would permit a service provider to offer one type of service within a "home" cell sector (one directory number), and another type of service outside that home cell sector (a different directory number), for example. Multiple directory number/cell locations could also be supported, so that a mobile station may be provided different types of service in each of a number of different geographical locations. As previously described, this location information may be obtained from cell sector information available at a MSC, or through a GPS unit, for example.

The following illustrative call scenario diagrams assume, for the sake of simplicity of exposition, that a mobile station has just two directory numbers associated with it, one for a "home" location, and one for an "away" location. As previously described, each of the mobile stations may have more than two directory numbers associated with them and the assignment of directory numbers for a given call need not be determined by the location of the mobile stations.

Figure 3:
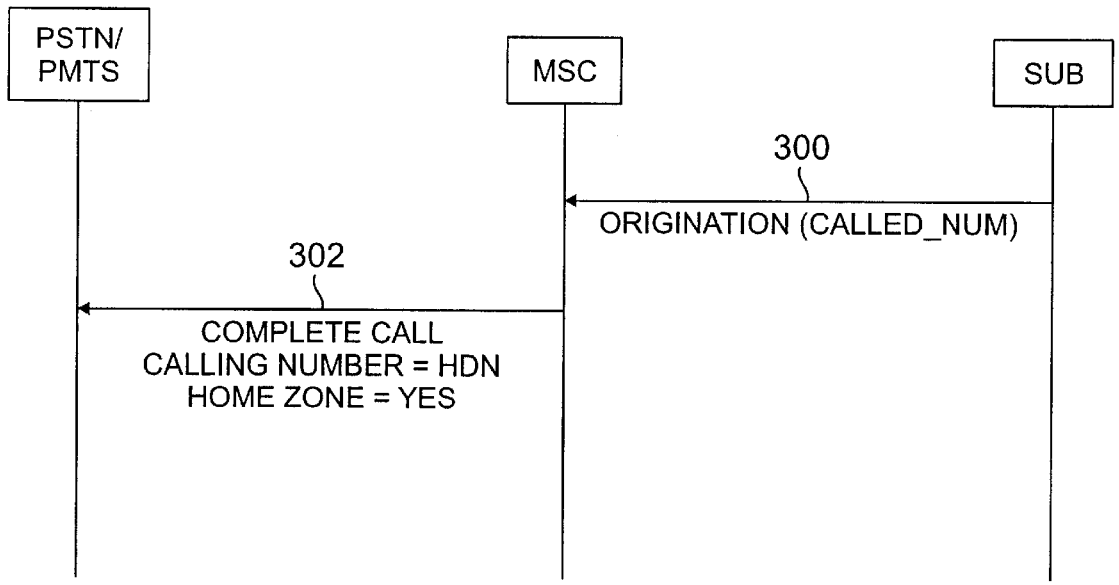
FIG. 3 is a call scenario diagram that illustrates the completion of a call from a mobile station within its "home" zone.

The call scenario diagram of FIG. 3 depicts the origination of a telephone call from a mobile station that is located within its "home" zone, in accordance with the principles of the present invention. In step 300 the subscriber initiates a call and information, including the subscriber's mobile identifier, is routed to a MSC. In step 302 the MSC determines that the mobile station is in its home location and passes the home directory number (HDN), that is, the directory number associated with the mobile station's home cellular sector, to the publicly switched telephone system. When the call is completed, the HDN may be displayed on any receiving instrument that features "caller ID".

Figure 4:
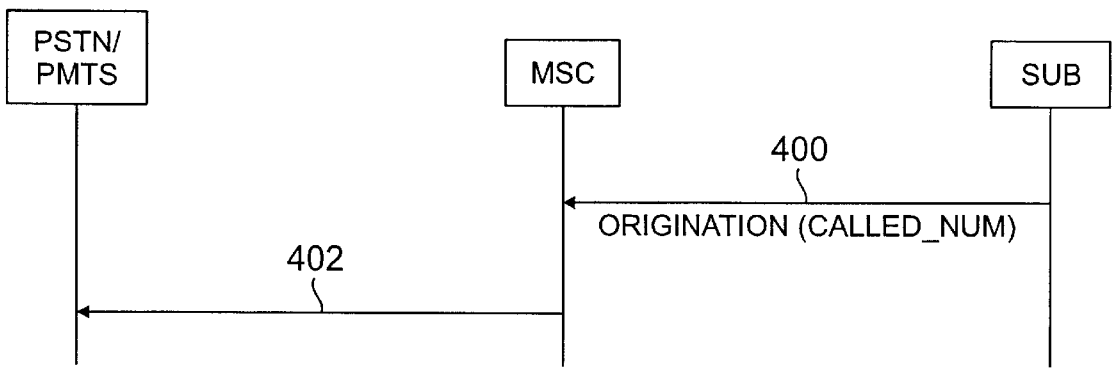
FIG. 4 is a call scenario diagram depicting the origination of a telephone call from a mobile station located outside its "home" zone.

The call scenario diagram of FIG. 4 illustrates the origination of a telephone call from a mobile station that is located outside its "home" zone. In step 400 the subscriber initiates a call and information, including the subscriber's mobile identifier, is routed to a MSC. In step 402 the MSC determines that the mobile station is outside its home location and passes the mobile directory number (MDN), the directory number associated with cellular sectors outside the mobile station's home cellular sector, to the publicly switched telephone system. When the call is completed, the MDN may be displayed on any receiving instrument that features "caller ID".

The MSC, or other element in the system 100, includes a device such as a computer, which is used to compare the database entries of the mobile identifier and supplemental information, to the received mobile identifiers and supplemental information. This comparison permits the device to determine which of the directory numbers to use for a particular call. For example, if the received mobile identifier and supplemental information correspond to a mobile station within its home zone, comparison of received and stored values would determine that the mobile station's home directory number should be employed for the call. Similarly, if the received information, the mobile station identifier and geographical information, indicate that the mobile station is outside its home zone, the comparison would reveals that the mobile directory number should be employed for the call.

Figure 5:
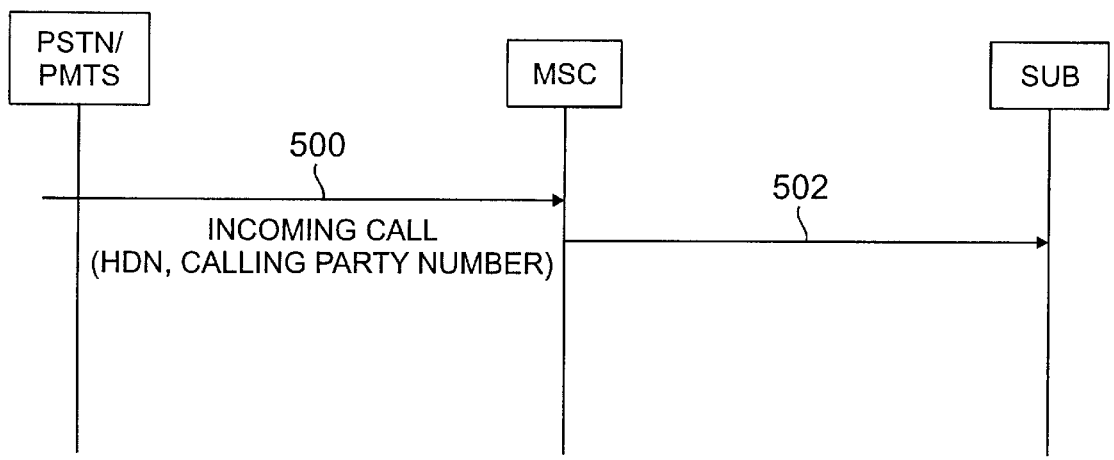
FIG. 5 is a call scenario diagram of a call originating in, or passed through, the publicly switched telephone network (PSTN), using a "home" directory number for the mobile station.

In the illustrative call scenario diagram of FIG. 5 a call originates in step 500 within the publicly switched telephone network. In this and other examples, the call may actually originate in, or be transferred through the PSTN. In this example the directory number employed by the PSTN is the mobile station's home directory number, which the MSC employs in step 502 to attempt terminating the call. If the mobile station is within its home sector, the MSC, which has access to station location information, will deliver the call to the station. If the mobile station is not within its home sector, the MSC will not deliver the call, but may forward the call to another directory number. This other directory number could be station's MDN, for example. The forwarding number may be determined by the user's activation of a call-forwarding feature. Alternatively, the call may be forwarded to the subscriber's answering service.

Figure 6:
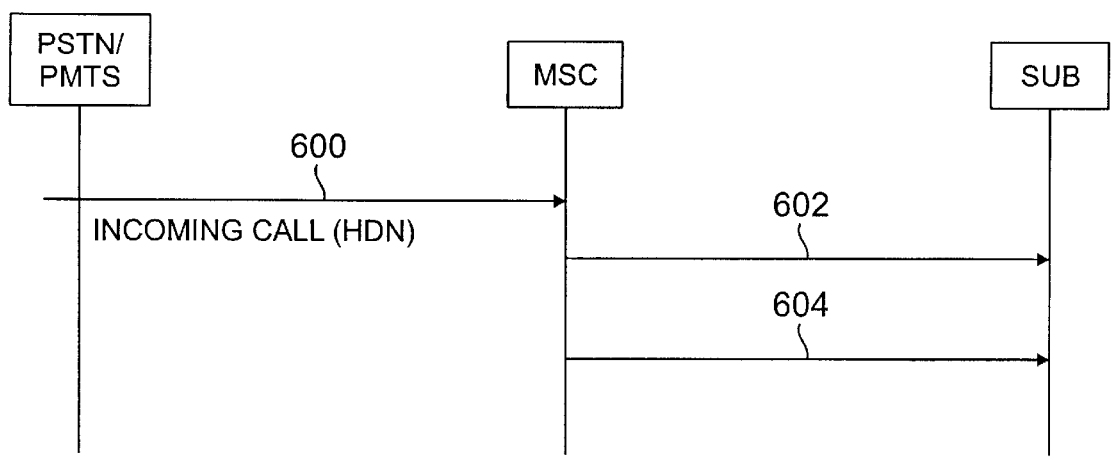
FIG. 6 depicts the delivery of call to a mobile station that moves outside its home location during a call.

The call scenario diagram of FIG. 6 depicts the delivery of a call to a mobile station that is originally located within its home sector. In step 600 the PSTN delivers the home directory number to the mobile switching center. In step 602 the mobile switching center terminates the call with the mobile station. Should the mobile station depart from its home sector, the mobile switching center will detect this departure. In response, the mobile switching center may send a message to the mobile subscriber in step 604 alerting the subscriber to the fact that he has moved outside his home location. Since operation outside his home location may imply a different set of services and a different pricing structure, the subscriber may then terminate the call. Alternatively, once the mobile switching center determines that the subscriber has exited his home sector, in step 604 the mobile switching center may allow the subscriber a grace period in which to return to his home sector and, if he does not return, drop the call. Or, in step 604 the mobile switching center could continue the call so long as the mobile station is in the "talk" state, with the mobile switching center noting that the station is outside its home location and assigning whatever pricing differential might be applicable.

Figure 7:
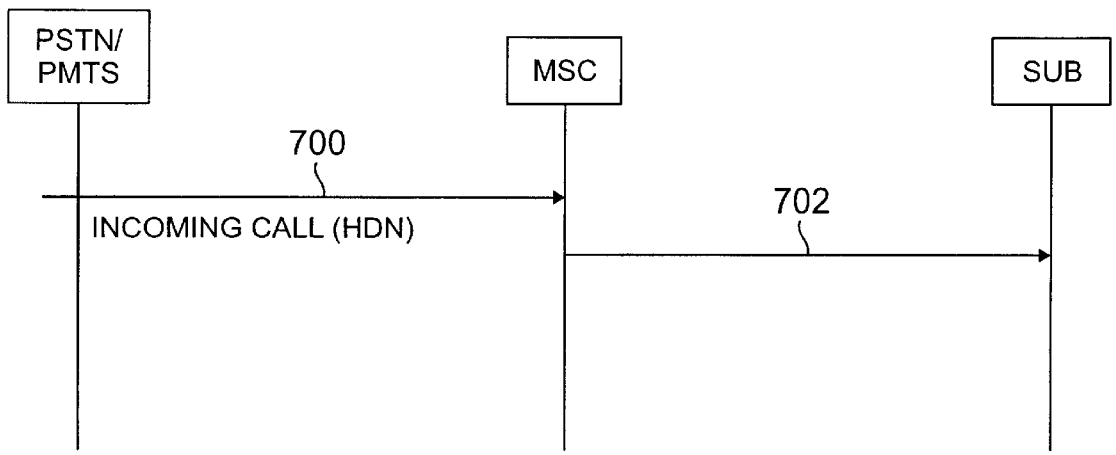
FIG. 7 is a call scenario diagram that illustrates the PSTN's attempted delivery of a call to a mobile station's home directory number while the mobile station is outside it's home location zone.

In the call scenario diagram of FIG. 7 the PSTN attempts to deliver a call to a mobile station's home directory number while the station is outside the home location and is in the idle mode. In step 700 the PSTN delivers the home directory number to the mobile switching center. If the customer service has been defined as "home only", the mobile switching center may indicate to the calling party that the mobile directory number should be used to complete the call. Alternatively, the mobile switching center may forward the call to the user's voice mail (step 702), for example.

Figure 8:
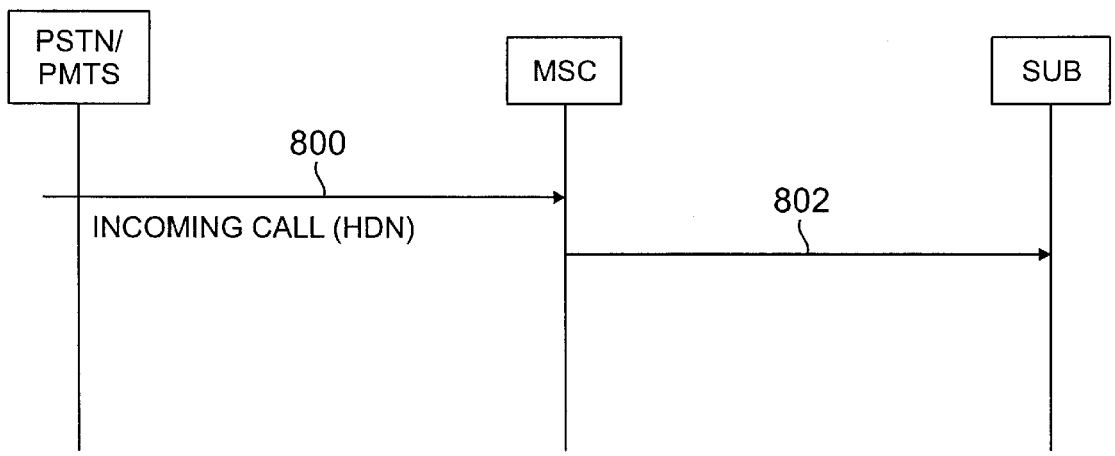
FIG. 8 is a call scenario diagram that illustrates the delivery of a call using a mobile station's home directory number to a mobile station located within its home zone.

In the call scenario diagram of FIG. 8 the PSTN delivers the user's mobile directory number to the mobile switching center in step 800. In this case, the call may be successfully terminated in step 802, no matter whether the subscriber is within his home location, home cellular sector, for example, or not. The customer may pay a premium for service that employs the mobile directory number and, consequently, may prefer that calls be made to his home location directory number whenever he is within his home location range.

The foregoing description of specific embodiments of the invention has been presented for the purposes of illustration and description. It is not intended to be exhaustive or to limit the invention to the precise forms disclosed, and many modifications and variations are possible in light of the above teachings. For example, although generally written in terms of cellular telephone systems, the invention may be used in conjunction with a personal communications services (PCS) system, with appropriate modifications known to those familiar with the art. The embodiments were chosen and described to best explain the principles of the invention and its practical application, and to thereby enable others skilled in the art to best utilize the invention. It is intended that the scope of the invention be limited only by the claims appended hereto.

What is claimed is:

1. A method operative to process a call including a mobile station comprising:
   storing a mobile identifier associated with the mobile station;
   storing a plurality of directory numbers associated with the mobile station;
   storing supplemental information in association with at least one of the plurality of directory numbers;
   receiving a mobile identifier associated with the mobile station;
   receiving supplemental information regarding the mobile station;
   comparing the received mobile identifier and supplemental information with the stored mobile identifier and supplemental information; and
   selecting one of the plurality of directory numbers for use in further processing based on a result of the comparison.

2. The method of claim 1 wherein storing a mobile identifier comprises storing a mobile identification number (MIN).

3. The method of claim 1 wherein storing a mobile identifier comprises storing an international mobile service identifier (IMSI).

4. The method of claim 1 wherein storing the supplemental information comprises storing geographical information that uniquely associates each of the directory numbers with the mobile station.

5. The method of claim 4 further comprising:
   receiving a directory number associated with a mobile station;
   receiving supplemental information related to the mobile station; and,
   determining a type of service to be afforded to the mobile station based on the received supplemental information.

6. The method of claim 5 wherein the received supplemental information comprises the current location of the mobile station.

7. The method of claim 6 wherein one type of service is associated with a directory number whenever the associated mobile station is within a predetermined geographical area and a different type of service is associated with the same directory number whenever the associated mobile station is outside the predetermined geographical area.

8. The method of claim 7 wherein one type of service is associated with a second directory number whenever the associated mobile station is within the predetermined geographical area and a different type of service is associated with the second directory number whenever the associated mobile station is outside the predetermined geographical area.

* * * * *